(12) United States Patent
Gary et al.

(10) Patent No.: US 10,837,694 B2
(45) Date of Patent: Nov. 17, 2020

(54) REFRIGERATION APPLIANCE FAN

(71) Applicant: WHIRLPOOL CORPORATION, Benton Harbor, MI (US)

(72) Inventors: Adam Gary, Marco Island, FL (US); Keeley Kabala, North Liberty, IA (US); Raghu Muddasani, Iowa City, IA (US); Jeremiah S. Papke, North Liberty, IA (US); Kyle Van Meter, Coralville, IA (US); Scott Wesbrook, Cedar Rapids, IA (US)

(73) Assignee: Whirlpool Corporation, Benton Harbor, MI (US)

( * ) Notice: Subject to any disclaimer, the term of this patent is extended or adjusted under 35 U.S.C. 154(b) by 690 days.

(21) Appl. No.: 15/377,455

(22) Filed: Dec. 13, 2016

(65) Prior Publication Data

US 2018/0164020 A1 Jun. 14, 2018

(51) Int. Cl.
| | |
|---|---|
| *F25D 11/02* | (2006.01) |
| *F25D 21/04* | (2006.01) |
| *F25D 17/06* | (2006.01) |
| *F25D 17/04* | (2006.01) |
| *F25D 29/00* | (2006.01) |

(52) U.S. Cl.
CPC .............. *F25D 21/04* (2013.01); *F25D 11/02* (2013.01); *F25D 17/047* (2013.01); *F25D 17/062* (2013.01); *F25D 17/065* (2013.01); *F25D 29/00* (2013.01); *F25B 2313/0312* (2013.01); *F25B 2600/112* (2013.01); *F25C 2400/10* (2013.01); *F25D 2317/061* (2013.01); *F25D 2317/062* (2013.01); *F25D 2317/0666* (2013.01); *F25D 2317/0682* (2013.01); *F25D 2323/021* (2013.01); *F25D 2700/00* (2013.01); *Y02B 40/32* (2013.01)

(58) Field of Classification Search
CPC .... F25D 21/025; F25D 17/017; F25D 17/065; F25D 17/047; F25D 17/005; F25D 21/04; F25D 11/02; F25D 2317/061; F25D 2317/062; F25D 2700/00
USPC .......................................................... 454/183
See application file for complete search history.

(56) References Cited

U.S. PATENT DOCUMENTS

| | | |
|---|---|---|
| 5,165,252 A | 11/1992 | Hannibalsen |
| 6,176,776 B1 | 1/2001 | Finkelstein et al. |
| 7,726,754 B2 | 6/2010 | Keller et al. |
| 8,186,173 B2 | 5/2012 | Schropp et al. |

(Continued)

FOREIGN PATENT DOCUMENTS

| | | | |
|---|---|---|---|
| EP | 3147603 A1 * | 3/2017 | ........... F25D 17/047 |
| JP | H06137750 A | 5/1994 | |

(Continued)

*Primary Examiner* — Grant Moubry
*Assistant Examiner* — Ryan L Faulkner
(74) *Attorney, Agent, or Firm* — Price Heneveld LLP (57) ABSTRACT

A refrigeration appliance includes a freezer compartment. An ice maker return duct fluidly couples an ice maker compartment and the freezer compartment. A pressure sensor is positioned within the freezer compartment and is configured to detect a pressure differential between the freezer compartment and an external environment. A fan is positioned within the ice maker return duct and is configured to be activated when the pressure within the freezer compartment is lower than the external environment.

18 Claims, 5 Drawing Sheets

(56) References Cited

U.S. PATENT DOCUMENTS

| | | |
|---|---|---|
| 2006/0260345 A1 | 11/2006 | Coulter et al. |
| 2007/0261424 A1 | 11/2007 | Wang |
| 2009/0320515 A1 | 12/2009 | Bischofberger et al. |
| 2010/0077775 A1 | 4/2010 | Smith et al. |
| 2010/0077778 A1 | 4/2010 | Kim |
| 2014/0034157 A1 | 2/2014 | Kwon |
| 2014/0060106 A1 | 3/2014 | Van Meter et al. |
| 2016/0054046 A1* | 2/2016 | Sim ................ F25D 17/005 62/126 |
| 2016/0290713 A1* | 10/2016 | Twiggar, III .............. E05D 7/00 |
| 2016/0370091 A1* | 12/2016 | Koo ................ F25D 17/065 |

FOREIGN PATENT DOCUMENTS

| | | |
|---|---|---|
| JP | H08327215 A | 12/1996 |
| WO | 2015128165 A1 | 9/2015 |

\* cited by examiner

REFRIGERATION APPLIANCE FAN

FIELD

The present disclosure generally relates to refrigeration appliances, and more particularly, to refrigeration appliances incorporating fans for preventing frost buildup within freezer compartments.

BACKGROUND

Freezer compartments within refrigeration appliances may experience a pressure differential relative the surroundings of the refrigeration appliance due to the cooling and circulation of air within the appliance. Such a pressure differential may result in warm and/or humid air entering the freezer compartment. Warm or humid air entering the freezer compartment may result in the formation of frost and ice accumulation. Further, pressure differentials may increase the force required to open a door of the appliance.

SUMMARY OF THE DISCLOSURE

According to one feature of the present disclosure, a refrigeration appliance includes a freezer compartment. An ice maker return duct fluidly couples an ice maker compartment and the freezer compartment. A pressure sensor is positioned within the freezer compartment and is configured to detect a pressure differential between the freezer compartment and an external environment. A fan is positioned within the ice maker return duct and is configured to be activated when the pressure within the freezer compartment is lower than the external environment.

According to another feature of the present disclosure, a refrigeration appliance includes a freezer compartment and an ice maker compartment. A pressure sensor is positioned within the freezer compartment and is configured to detect an air pressure within the freezer. A fan is fluidly coupled with the ice maker compartment and the freezer compartment. The fan is configured to be activated when a pressure differential between the freezer compartment and an external environment is sensed.

According to yet another feature of the present disclosure, a method of operating a refrigerator includes the steps of sensing negative air pressure relative to an atmospheric pressure in a freezer compartment of the refrigerator; activating a fan positioned in an ice maker return duct of the refrigerator to blow air into the freezer compartment; and deactivating the fan once a sensed air pressure in the freezer compartment is about equal to or greater than the atmospheric pressure.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

DETAILED DESCRIPTION

Figure 1:
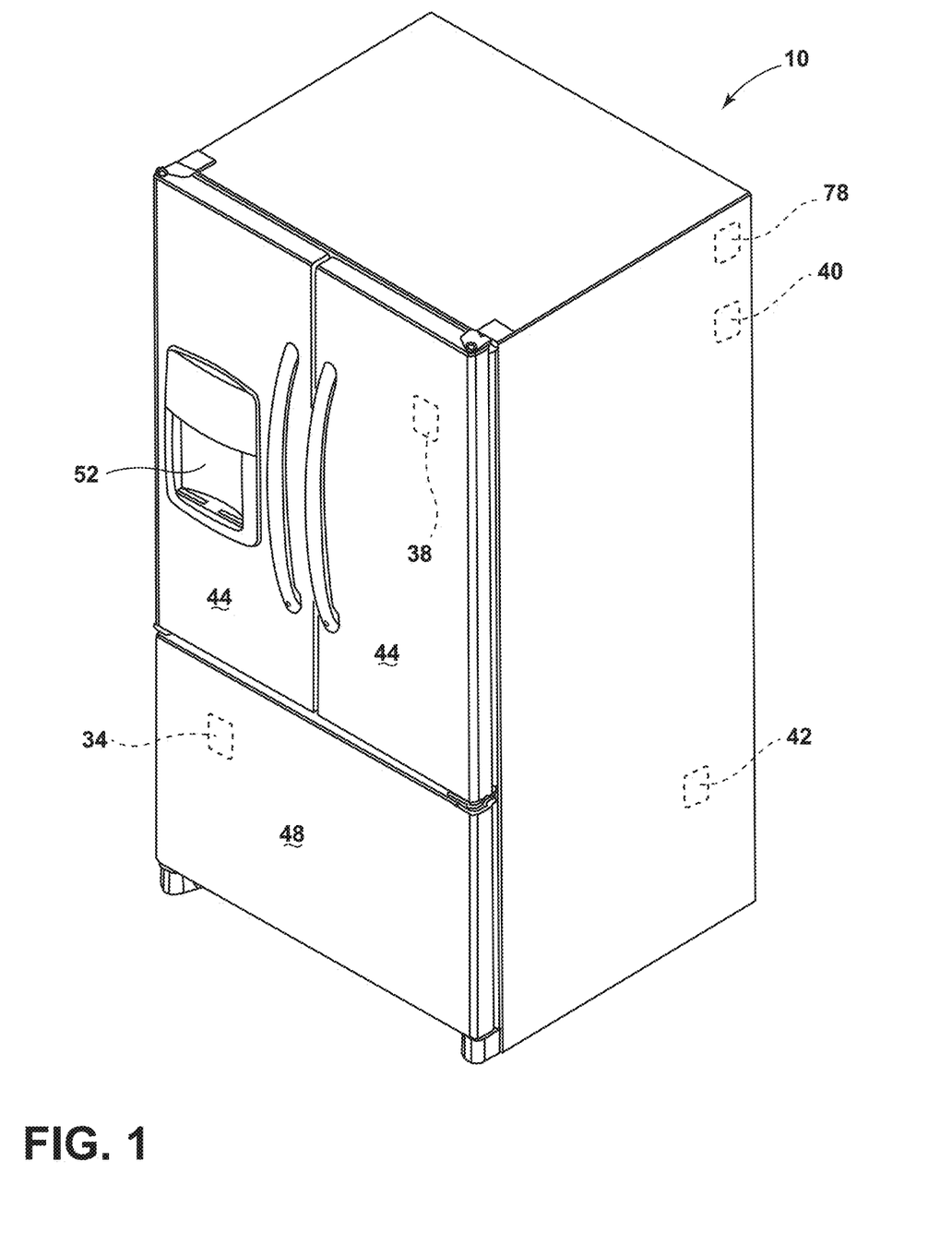
FIG. 1 is a perspective view of a French-door bottom-mount refrigeration appliance, according to one example.

For purposes of description herein, the terms "upper," "lower," "right," "left," "rear," "front," "vertical," "horizontal," and derivatives thereof, shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring now to FIGS. 1-5, reference numeral 10 generally designates a refrigeration appliance 10 including a freezer compartment 14 and a refrigeration compartment 18. An ice maker compartment 22 may be positioned outside of the freezer compartment 14. An ice maker supply duct 26 and an ice maker return duct 30 fluidly couple the ice maker compartment 22 with the freezer compartment 14. A pressure sensor 34 is positioned within the freezer compartment 14. The sensor 34 may be configured to detect a pressure differential between the freezer compartment 14 and an external environment (e.g., the atmosphere) to the refrigeration appliance 10. A fan 38 is positioned within the ice maker return duct 30. The fan 38 may be configured to be activated when the pressure within the freezer compartment 14 is lower than the external environment (i.e., a negative pressure is sensed within the freezer compartment 14). A controller 40 may be electrically coupled to the fan 38 and the sensor 34 for activating the fan 38.

Figure 2:
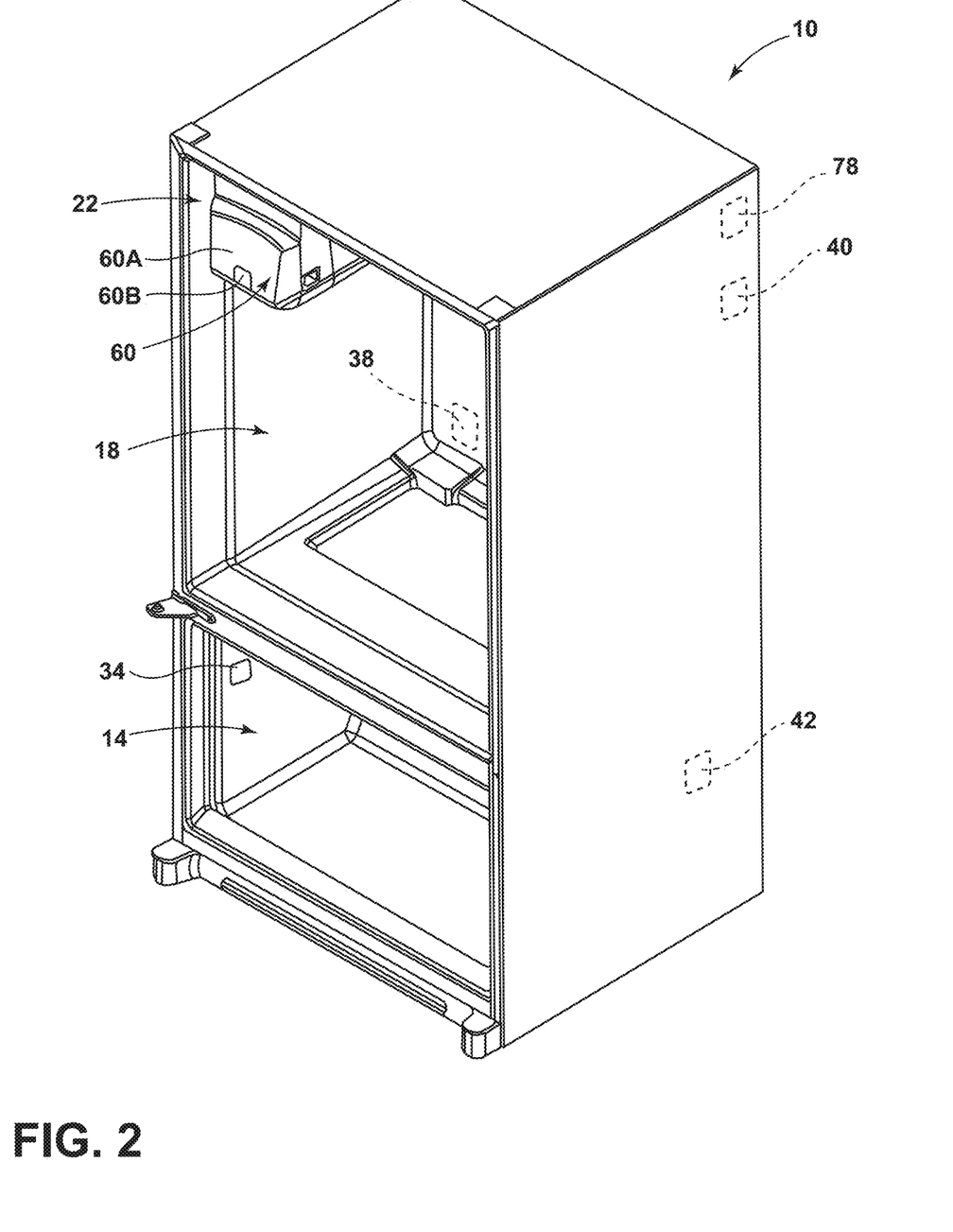
FIG. 2 is a perspective view of the refrigeration appliance having its doors removed, according to one example.
Figure 3:
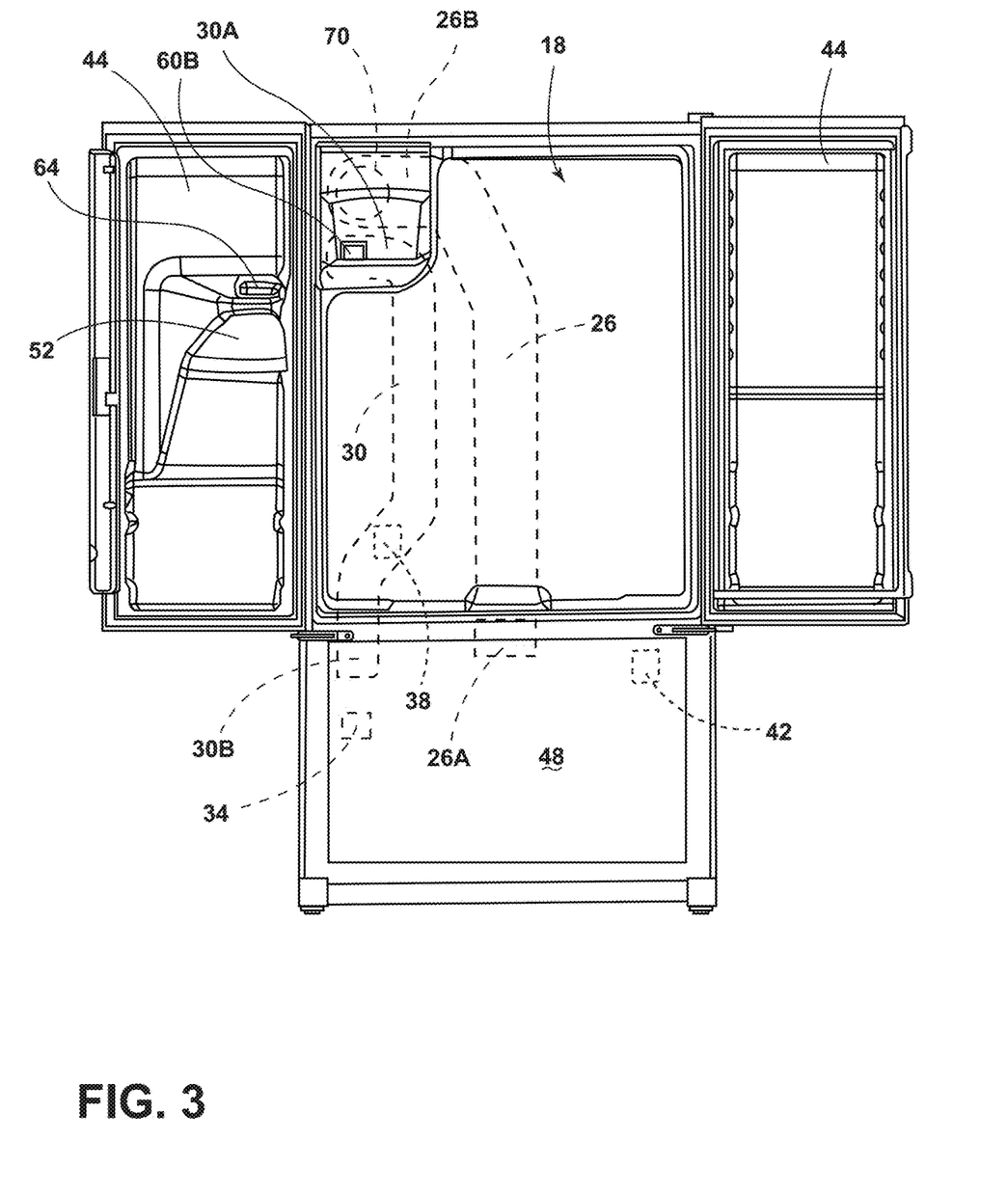
FIG. 3 is a front elevation view of the refrigeration appliance having its refrigeration compartment doors open, according to one example.

Referring now to FIGS. 1-3, the refrigeration appliance 10 is depicted as a French-door bottom-mount refrigerator, but it will be understood that the refrigeration appliance 10 may be a side-by-side refrigerator, a bottom mount refrigerator and/or a top mount refrigerator. The refrigeration appliance 10 includes the refrigeration compartment 18 and the freezer compartment 14. The refrigeration compartment 18 may be a fresh food compartment configured to store food stuffs and/or perishables at temperatures above freezing (e.g., maintained at about 3° C. or about 4° C.) for long time period. The freezer compartment 14 may be maintained at a subzero temperature (e.g., temperatures at or below about 0° C.) for long term storage of perishables in a frozen state. In general, the refrigeration compartment 18 may have an internal volume greater than the freezer compartment 14. The refrigeration appliance 10 includes an evaporator 42 which cools the refrigeration compartment 18 and the freezer compartment 14. One or more refrigeration doors 44 are provided for the refrigeration compartment 18 and a freezer door 48 is provided for the freezer compartment 14. One of the refrigeration doors 44 may include an ice dispenser 52, which may also include a water dispenser.

The ice maker compartment 22 is provided in the refrigeration compartment 18. In the depicted example, the ice maker compartment 22 is positioned in an upper corner of the refrigeration compartment 18, but it will be understood that the ice maker compartment 22 may be positioned in other locations within the refrigeration compartment 18 without departing from the teachings provided herein. For example, the ice maker compartment 22 may be positioned within the refrigeration doors 44 and/or the freezer door 48. The ice maker compartment 22 may include an ice maker covering 60. The ice maker covering 60 may include a front cover 60A that is insulated to prevent the cold air of the ice maker compartment 22 from passing into the refrigeration compartment 18. The ice maker covering 60 defines an opening 60B which mates with a chute 64 of the ice dispenser 52. A seal may be provided between the opening 60B and the chute 64 to prevent cold air from passing from the ice maker compartment 22 to the refrigeration compartment 18. An ice making apparatus may be positioned within the ice maker covering 60. The ice maker compartment 22 may be configured to use cool air provided by the ice maker supply duct 26 to freeze water and dispense the ice through the chute 64. The ice maker compartment 22 is maintained at a temperature of 0° C. or less in order to form ice, but may not be as cold as the freezer compartment 14. The ice maker covering 60 may be integrally formed adjacent the refrigeration compartment 18 during a liner forming process. Alternatively, the ice maker covering 60 may be a separate component from the liner of the refrigeration compartment 18 and attached (e.g., by overhead rails, fasteners, etc.) to the liner.

Figure 4:
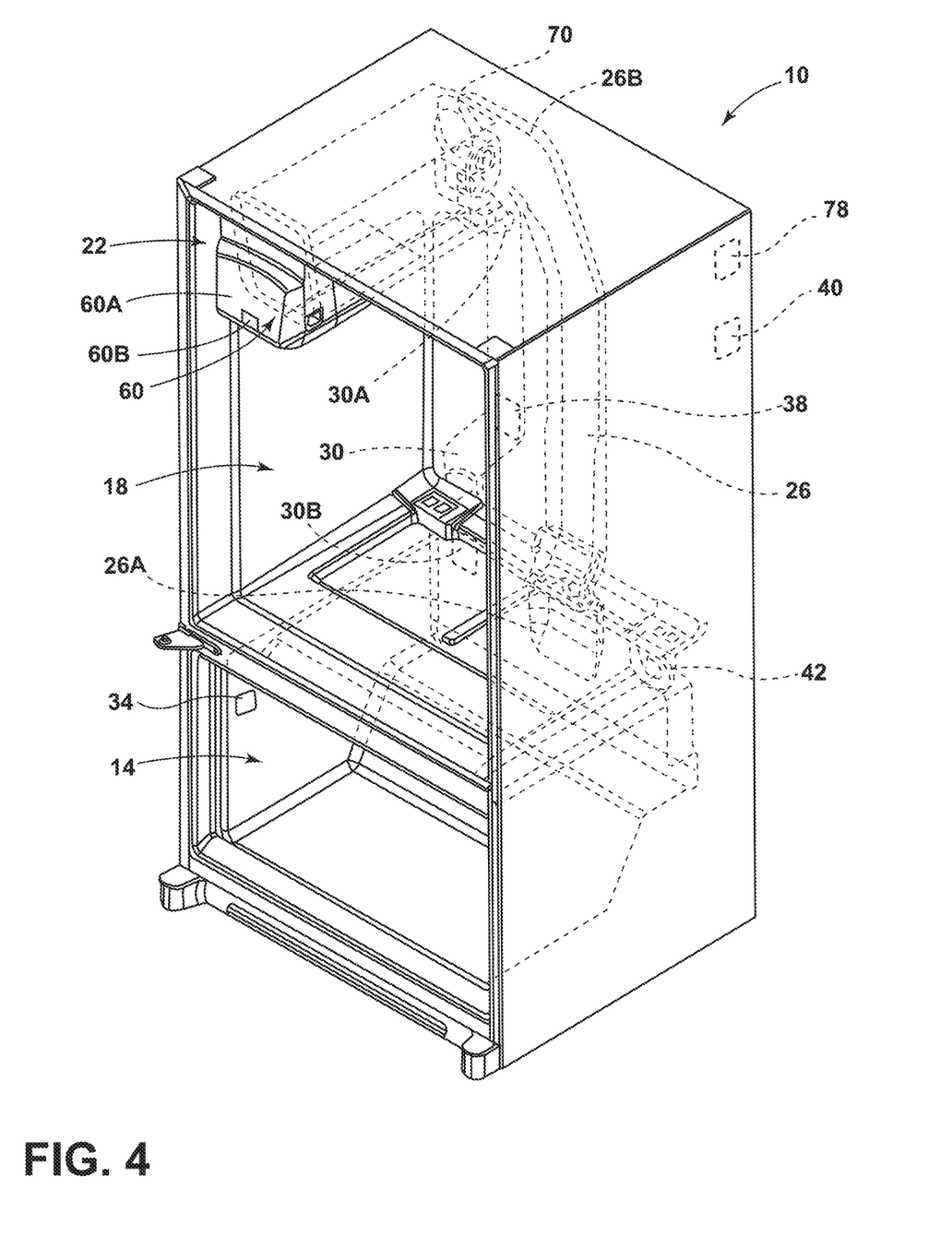
FIG. 4 is a perspective view of the refrigeration appliance having its doors in an open position, according to one example.

Referring now to FIGS. 3 and 4, the ice maker supply duct 26 extends between the freezer compartment 14 and the ice maker compartment 22. The ice maker supply duct 26 fluidly couples the freezer compartment 14 and the ice maker compartment 22. In other words, the supply duct 26 allows chilled air to pass from the freezer compartment 14 to the ice maker compartment 22. The supply duct 26 has a lower air inlet 26A within the freezer compartment 14 and an upper outlet 26B connected to an ice maker fan 70 mounted on the back wall of the ice maker compartment 22. The ice maker fan 70 draws cold air from the freezer compartment 14 and forces the cold air into the ice maker compartment 22 to facilitate ice making. It will be understood that additionally or alternatively, the ice maker fan 70 may be positioned at the inlet 26A, or anywhere along, the supply duct 26. The ice maker fan 70 controls the air flow from the freezer compartment 14 to the ice maker compartment 22 and may be a variable speed fan. The ice maker supply duct 26 may be positioned within a rear wall of the refrigeration appliance 10, but may additionally or alternatively be positioned within side walls of the refrigeration appliance 10.

Similarly to the supply duct 26, the ice maker return duct 30 may be positioned within a rear wall of the refrigeration appliance 10. The return duct 30 may additionally or alternatively be positioned within side walls of the refrigeration appliance 10. The ice maker return duct 30 fluidly couples the freezer compartment 14 and the ice maker compartment 22. In other words, the return duct 30 allows chilled air to pass from the ice maker compartment 22 to the freezer compartment 14. The ice maker return air duct 30 includes an upper end 30A connected to the ice maker compartment 22, and a lower end 30B terminating within the freezer compartment 14.

The fan 38 is positioned within the ice maker return duct 30. The fan 38 may be positioned within the upper end 30A, the lower end 30B or anywhere along the return duct 30. Further, the fan 38 may be a fan assembly including a plurality of fans, positioned proximate one another, or spread across the ice maker return duct 30. The fan 38 may be configured to blow air from the ice maker compartment 22 into the freezer compartment 14. Further, due to a negative pressure generated by the activation of the fan 38, air from within the refrigeration compartment 18 may be sucked into the ice maker compartment 22 and/or return duct 30 such that air from the refrigeration compartment 18 is blown into the freezer compartment 14. The fan 38 may be pulse width modulated in order to adjust a fan speed of the fan 38. For example, the magnitude of the fan speed may be controlled by the controller 40 to increase or decrease the volume of air blown by the fan 38 into the freezer compartment 14.

The sensor 34 may be positioned within the freezer compartment 14. In the depicted example, the sensor 34 is an air pressure sensor positioned on a side wall of the freezer compartment 14, but may additionally or alternatively be positioned on a back wall, a top wall and/or a bottom wall of the freezer compartment 14. Further, a plurality of sensors 34 may be positioned throughout, or in a single location, of the freezer compartment 14. The sensor 34 may be a pressure sensor, humidity sensor, an airflow (e.g., mass flow) sensor and/or combinations thereof. Further, in examples where a plurality of sensors 34 are utilized, each sensor 34 may be different (e.g., one pressure sensor 34, one humidity sensor 34, one air flow sensor 34).

In air pressure sensor examples of the sensor 34, the sensor 34 may be an absolute pressure sensor, a gauge pressure sensor, a vacuum pressure sensor, a differential pressure sensor, a sealed pressure sensor and/or combinations thereof. The pressure sensor examples of the sensor 34 may be analog or digital. In humidity sensor examples of the sensor 34, the sensor may be an absolute humidity sensor, a mixing ratio sensor, a mass ratio sensor, a relative humidity sensor, a specific humidity sensor, a frost point sensor, a volume ratio sensor, a parts-per-million by volume sensor, a parts-per-million by weight sensor and/or combinations thereof. In airflow or mass flow examples of the sensor 34, the sensor 34 may include a moving vane meter, a hot-wire sensor, a cold-wire sensor, a vortex sensor, a membrane sensor and/or combinations thereof.

The sensor 34 is electrically coupled with the controller 40 and configured to communicate data to the controller 40 based on the sensed condition (e.g., pressure, humidity, air flow) of the freezer compartment 14. The sensor 34 may be configured to work in conjunction with an external sensor 78 which is configured to detect a property of the external environment (e.g., atmosphere) around the refrigeration appliance 10. The external sensor 78 may be configured to detect the same property as the sensor 34, or a different property. Further, if the sensor(s) 34 is configured to detect multiple properties of the freezer compartment 14, the external sensor 78 may detect the same, or a different set of properties about the external environment of the refrigeration appliance 10. The external sensor 78 may be electrically coupled to the sensor 34 and/or the controller 40 so that differences between the external environment and freezer compartment 14 may be determined with respect to one or more of the sensed properties. For example, pressure, humidity and/or air flow differentials may be calculated by the controller 40 and/or sensor 34 and external sensor 78.

In another example, the refrigeration appliance 10 may not include the external sensor 78, but rather utilize a predetermined value. For example, pressure, humidity and/or airflow differentials may be calculated using the data provided by the sensor 34 and the predetermined value. The value may be based on manufacturer settings, user input settings, or calculated values. For example, a user or owner of the refrigeration appliance 10 may input an altitude and/or location (e.g., from which pressure and/or humidity may be looked up, preprogrammed, and/or determined) and the controller 40 may assign the predetermined value based on the input data from the user. Through comparison of the data from the sensor 34 and the predetermined value, a differential in the pressure, humidity and/or airflow may be determined.

The controller 40 may be configured to activate and/or deactivate the fan 38 based on the sensed properties of the freezer compartment 14 and/or the external environment. For example, if a pressure within the freezer compartment 14 is lower than the external environment (i.e., a pressure differential exists), the controller 40 may activate the fan 38 to blow air into the freezer compartment 14. Specifically, if a negative pressure differential (i.e., the pressure within the freezer compartment 14 is lower relative to the external environment) exists, the fan 38 may be activated to blow air into the freezer compartment 14. The fan speed of the fan 38, as controlled by the controller 40, may be based on the magnitude of the negative pressure differential sensed. For example, the greater the pressure differential (i.e., the greater the negative pressured sensed in the freezer compartment 14), the greater the fan speed.

Figure 5:
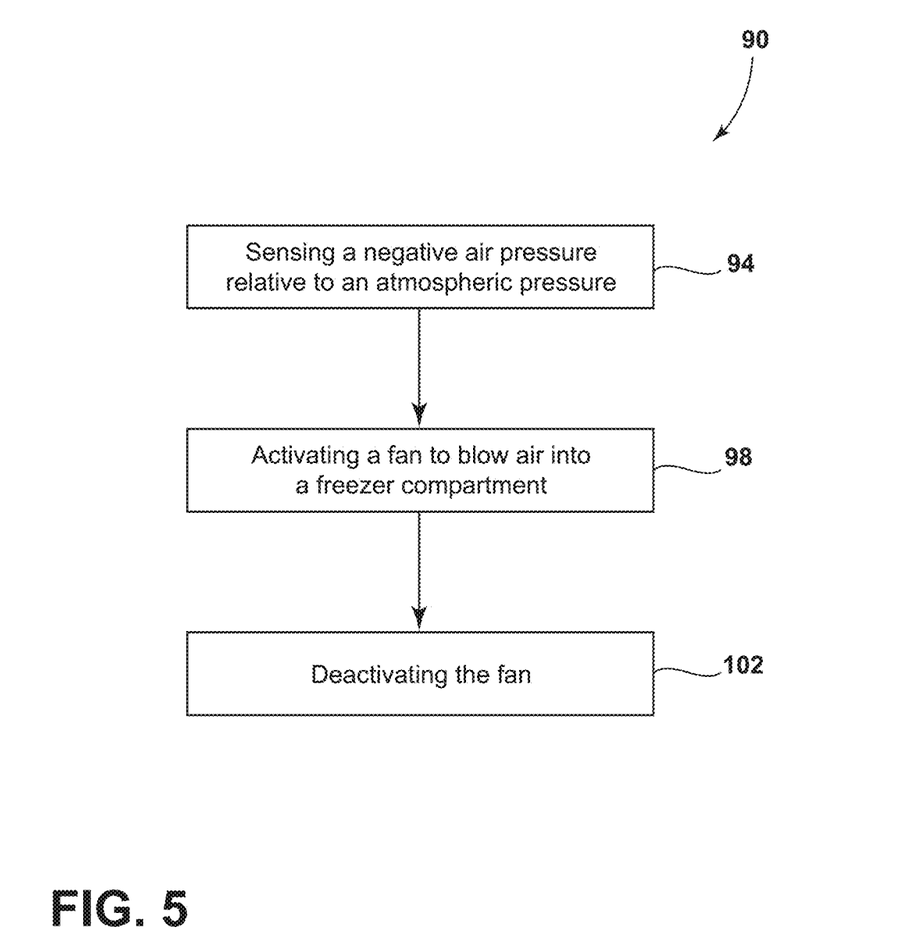
FIG. 5 is flow chart of a method of operating the refrigeration appliance, according to one example.

Referring now to FIG. 5, depicted is an exemplary method 90 of operating the refrigeration appliance 10. The method 90 may begin with a step 94 of sensing a negative air pressure relative to an atmospheric pressure within the freezer compartment 14. As explained above, the sensor 34 may be an air pressure sensor and the external sensor 78 may be an air pressure sensor. The controller 40 and/or sensors 34, 78 may compare the data from the air pressure sensor 34 and the external air pressure sensor 78 to determine a negative air pressure differential exists. The fan 38 may be configured to be inactive when the sensed pressure in the freezer compartment 14 is equal to or greater than the external environment pressure. Next, step 98 of activating the fan 38 to blow air into the freezer compartment 14 may be performed. The controller 40 may control the fan speed based on the sensed magnitude of the air pressure differential. Further, the fan speed may be adjusted while in use based on a magnitude of the air pressure differential if it changes. In other words, the fan speed may be decreased or increased as the magnitude of pressure differential decreases or increases, respectively. Next, step 102 of deactivating the fan 38 may be performed. The fan 38 may be deactivated once a sensed air pressure in the freezer compartment 14 (e.g., as sensed by the air pressure sensor 34) is equal to or greater than the atmospheric pressure (e.g., as sensed by the external air pressure sensor 78). It will be understood that the air pressure differential at which the controller 40 activates and deactivates the fan 38 may have to reach a predetermined threshold prior to activation and/or deactivation. For example, a predetermined threshold may be a 0.01%, 0.1%, 1%, 2%, 5% air pressure differential to activate or deactivate the fan 38. Further, the predetermined thresholds for activation and deactivation may be different than one another. The sensed internal air pressure of the freezer compartment 14 may be said to be about equal with the external atmospheric pressure if an air pressure differential between the two is less than about 10%. It will be understood that although described in connection with an air pressure differential, the method 90 may be implemented using any of the properties sensed by the sensor 34 and external sensor 78 (e.g., a humidity differential and/or an airflow differential). It will be understood that the steps of the method 90 may be performed in any order, simultaneously and/or omitted without departing from the teachings provided herein.

Use of the present disclosure may offer a variety of advantages. First, use of the fan 38 which is activated and deactivated based on sensed properties of the refrigeration appliance 10, may prevent unnecessary use of the fan 38. For example, by activating or running the fan 38 only when a sensed differential exists, the refrigeration appliance 10 may have a decreased noise and energy consumption. Second, use of the fan 38 within the return duct 30 reduces and/or eliminates the accumulation of frost and ice within the freezer compartment 14. Third, the addition of the fan 38 to the return duct 30 may allow for a low manufacturing cost solution which may be implemented in a variety of refrigeration appliance styles. Fourth, the present disclosure is a robust solution to negative pressure generation as the pressure can be equalized regardless of the usage pattern, condition of gaskets around the refrigeration appliance 10, alignment of the doors 44, 48, and/or other fault modes. Fifth, use of the present disclosure may reduce the amount of force used to open the refrigeration doors 44 and/or the freezer door 48. For example, by reducing the magnitude of the pressure differential between the freezer compartment 14 and the external environment, the force to open the freezer door 48 may be reduced. Such a reduction of force may be advantageous in allowing the refrigeration appliance 10 to meet regulations regarding minimum pull force on the doors 44, 48 while also minimizing the production of frost and ice within the freezer compartment 14.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A refrigeration appliance, comprising:
    a freezer compartment;
    an ice maker compartment;
    an ice maker return duct fluidly coupling the ice maker compartment and the freezer compartment and configured to direct air from the ice maker compartment to the freezer compartment;
    a first air pressure sensor positioned within the freezer compartment and configured to detect an internal air pressure within the freezer compartment;
    a second air pressure sensor coupled to said refrigeration appliance and configured to detect an atmospheric air pressure external to said refrigeration appliance;
    a fan positioned within the ice maker return duct; and
    a controller operably coupled to the first and second air pressure sensors to receive detected internal and atmospheric air pressures, wherein the controller is configured to determine an air pressure differential between the interior and atmospheric air pressures and activate the fan to blow air from at least one of the ice maker compartment and a refrigeration compartment into the freezer compartment when the detected internal air pressure is lower than the detected atmospheric air pressure.

2. The refrigeration appliance of claim 1, wherein the fan is configured to blow air from the ice maker compartment into the freezer compartment.

3. The refrigeration appliance of claim 2, wherein the fan is configured to blow air from the refrigeration compartment into the freezer compartment.

4. The refrigeration appliance of claim 3, wherein the ice maker compartment is positioned within the refrigeration compartment.

5. The refrigeration appliance of claim 1, wherein the fan is pulse width modulated.

6. The refrigeration appliance of claim 1, wherein a magnitude of a fan speed of the fan is based on a magnitude of the detected internal air pressure within the freezer compartment.

7. The refrigeration appliance of claim 1, further comprising:
    an ice maker supply duct fluidly coupling the freezer compartment and the ice maker compartment and configured to direct air from the freezer compartment to the ice maker compartment.

8. The refrigeration appliance of claim 1, wherein the fan is configured to be inactive when the detected internal air pressure in the freezer compartment is equal to or greater than the detected atmospheric air pressure.

9. A refrigeration appliance, comprising:
    a freezer compartment;
    an ice maker compartment in fluid communication with the freezer compartment;
    an air pressure sensor positioned within the freezer compartment and configured to detect an air pressure within the freezer compartment; and
    a fan fluidly coupled with the ice maker compartment and the freezer compartment and configured to blow air from at least one of the ice maker compartment and a refrigeration compartment into the freezer compartment; and
    a controller configured to receive a detected air pressure from the air pressure sensor, wherein the controller compares the detected air pressure to a predetermined air pressure.

10. The refrigeration appliance of claim 9, wherein a magnitude of a fan speed of the fan is based on a magnitude of a pressure differential.

11. The refrigeration appliance of claim 9, further comprising:
    an ice maker return duct fluidly coupling the ice maker compartment and the freezer compartment.

12. The refrigeration appliance of claim 11, wherein the fan is positioned within the ice maker return duct.

13. The refrigeration appliance of claim 12, wherein the fan is configured to blow air from the ice maker compartment into the freezer compartment.

14. The refrigeration appliance of claim 13, wherein the fan is configured to blow air from the refrigeration compartment into the freezer compartment.

15. A method of operating a refrigerator, comprising the steps:
    sensing an atmospheric air pressure external to said refrigerator;
    sensing an internal air pressure within the freezer compartment relative to the atmospheric air pressure;
    activating a fan positioned in an ice maker return duct of said refrigerator to blow air from at least one of an ice maker compartment and a refrigeration compartment into the freezer compartment; and
    deactivating the fan once the internal air pressure in the freezer compartment is about equal to or greater than the atmospheric air pressure.

16. The method of claim 15, further comprising the step of:
    adjusting a speed of the fan based on a magnitude of a pressure differential.

17. The method of claim 15, further comprising the step of:

blowing air from the ice maker compartment into the freezer compartment.

18. The method of claim 17, further comprising the step of:

blowing air from the refrigeration compartment into the freezer compartment.

\* \* \* \* \*